US006769349B2

(12) United States Patent
Arshad et al.

(10) Patent No.: US 6,769,349 B2
(45) Date of Patent: Aug. 3, 2004

(54) MULTI-FIBER CYLINDER POSITION SENSOR USING TIME-OF-FLIGHT TECHNIQUE

(75) Inventors: Mohammad Javaid Arshad, Naperville, IL (US); Alan D. Berger, Winfield, IL (US); Daniel L. Maierhafer, Seneca, SC (US); Danley C. Chan, Chicago, IL (US)

(73) Assignee: Case Corporation, Racine, WI (US)

( * ) Notice: Subject to any disclaimer, the term of this patent is extended or adjusted under 35 U.S.C. 154(b) by 543 days.

(21) Appl. No.: 09/872,874

(22) Filed: Jun. 4, 2001

(65) Prior Publication Data

US 2002/0180461 A1 Dec. 5, 2002

(51) Int. Cl.[7] ................................ F01B 31/12
(52) U.S. Cl. ................................ 92/5 R; 91/1
(58) Field of Search .................. 92/5 R; 91/1

(56) References Cited

U.S. PATENT DOCUMENTS

| 6,005,395 A | | 12/1999 | Chan et al. | |
| 6,142,059 A | * | 11/2000 | Chan et al. | ........ 92/5 R |
| 6,295,019 B1 | * | 9/2001 | Richards et al. | ........ 342/125 |
| 6,484,620 B2 | * | 11/2002 | Arshad et al. | ........ 92/5 R |

OTHER PUBLICATIONS

U.S. patent application Ser. No. 09/750,866, filed Dec. 28, 2000 entitled "Laser Based Reflective Beam Cylinder Sensor", Inventors: M. Javid Arshad; Alan D. Berger and Dan Chan.

U.S. patent application Ser. No. 09/872,895, filed Jun. 4, 2001 entitled "Multi–Fiber Multi–Cylinder Position Method and Apparatus Using Time–Of–Flight Technique", Inventors: Mohammad J. Arshad; Daniel L. Maierhafer and Alan D. Berger.

* cited by examiner

Primary Examiner—Edward K. Look
Assistant Examiner—Michael Leslie
(74) Attorney, Agent, or Firm—John William Stader; Collin A. Webb

(57) ABSTRACT

A hydraulic actuator is disclosed having a cylinder with a piston that is moved by hydraulic fluid. A light guide in one end of the cylinder directs a laser beam into the cylinder, and off the piston where the beam is reflected. The beam then exits the cylinder through at least two light guides connected to two corresponding optical fibers. Each of the optical fibers are joined together into one fiber that carries the reflected beam of light to a photo-diode located remote from the cylinder. A control circuit measures the time of flight of the laser beam.

25 Claims, 3 Drawing Sheets

MULTI-FIBER CYLINDER POSITION SENSOR USING TIME-OF-FLIGHT TECHNIQUE

CROSS REFERENCE TO RELATED APPLICATIONS

This application claims priority from U.S. Ser. No. 09/750,866 which was filed in the United States Patent and Trademark Office on Dec. 28, 2000 and is entitled "Laser Based Reflective Beam Cylinder Sensor".

FIELD OF THE INVENTION

The invention relates generally to position sensing of hydraulic and pneumatic actuators. More particularly, it relates to sensing using laser light sources and detectors and determining the position of the actuator using time-of-flight algorithms.

BACKGROUND OF THE INVENTION

Position sensing for hydraulic or pneumatic actuators typically uses an external position sensor, such as a rotary rheostat or potentiometer. Alternatively, linear rheostats or variable differential transformers are employed. These systems suffer from poor accuracy, extensive wear, and fragility in many applications, especially demanding applications such as their use on work and agricultural vehicles.

These sensors are quite susceptible to damage, and suffer from being damaged during vehicle operation, or from the extremes in temperature that work and agricultural vehicles face.

In an effort to solve these problems, new methods of measuring the position of a hydraulic or pneumatic actuator have been devised that use microwaves. These waves are transmitted from one end of the cylinder, reflect off the piston, and return to a detector. By measuring the time of flight of these waves, the location of the piston can be determined. Such an example is shown in U.S. Pat. No. 6,005,395.

The microwave transmitter suffers from high cost and difficulties in determining which of the many reflections in the cylinder is the proper one to measure.

In an alternative system, the pulse generating and timing circuit of U.S. Pat. No. 6,005,395 are used, but drive a laser light source and responds to a reflection of that beam against a laser light detector, such as that shown in co-pending U.S. patent application Ser. No. 09/750,866.

This arrangement also has drawbacks. When the piston moves toward or away from the source and detector, the reflected light follows multiple paths that, like the microwave transmitter and receiver pair, make the reflected pulses difficult to interpret. It is difficult to extract a good pulse indicative the precise time of flight of the laser beam.

What is needed is a better arrangement of laser light source and detector that provides a more precise time-of-flight measurement. It is an object of this invention to provide such an arrangement.

SUMMARY OF THE INVENTION

In accordance with a first embodiment of the invention, a fluid actuated cylindrical actuator is provided that includes a cylinder having first and second ends, an end cap fixed to the first end of the cylinder and having a rod opening, a piston disposed in the cylinder, a rod coupled to the piston and extending from inside the cylinder to outside the cylinder and passing through the rod opening, a first light guide extending from inside the cylinder to outside the cylinder and adapted to transmit at least a first beam of laser light at a first frequency from outside the cylinder to inside the cylinder and to bar the passage of the fluid, and a plurality of second light guides having first ends extending from inside the cylinder to outside the cylinder and distal second ends that are coupled to at least one light detector. Each of the second light guides may be adapted to substantially simultaneously transmit at least a first reflected portion of the beam of laser light from inside the cylinder to outside the cylinder.

The first light guide may be disposed to transmit the first beam of laser light substantially along a longitudinal axis of the cylinder such that the first beam impinges on a reflective portion of the piston over substantially an entire range of piston travel.

Each of the second light guides may be disposed on opposing sides of the first light guide such that they both receive a reflected portion of the light beam.

Each of the second light guides may be disposed substantially equidistantly from the first light guide.

The plurality of second light guides may include at least three light guides that are disposed in a semicircular arc about the first light guide.

The second ends of the plurality of second light guides may be optically coupled to a single light detector having a single electrical output generated by light carried by at least two of the plurality of second light guides.

In accordance with a second embodiment of the invention, a hydraulic actuator for an agricultural or construction vehicle is provided, the actuator including a cylinder having a substantially circular internal diameter and a longitudinal cylindrical axis, a piston having a substantially circular outer diameter and configured to be received in and hydraulically sealed against the inner diameter of the cylinder, a piston rod with a substantially circular outer rod diameter that is fixed to the piston and extends from the piston inside the cylinder, through a first end wall of the cylinder to a location outside the cylinder, wherein the first end wall is disposed to enclose and seal a first end of the cylinder and is substantially perpendicular to the longitudinal axis of the cylinder, a second end wall fixed to the cylinder and disposed to seal a second end of the cylinder substantially perpendicular to the longitudinal axis of the cylinder, the second end wall including a first optical path configured to transmit a beam of laser light through the second end wall to a reflective surface fixed to the piston and further including a plurality of second optical paths configured to transmit the reflected beam of laser light back through the end wall, a first optical fiber optically and mechanically coupled to the second end wall to transmit the beam of laser light from a remote laser light source to the first optical path and a plurality of second optical fibers optically and mechanically coupled to the second end wall to transmit the reflected beam of laser light to a remote laser light receiver.

The first optical path and the plurality of second optical paths may include at least one hermetically sealed fiber optical feed-through or connector extending through the second end wall.

The first optical fiber and the plurality of second optical fibers may be multi-modal optical fibers.

The hydraulic actuator may also include a first photodiode configured to receive light transmitted through at least one of the plurality of second optical fibers. The actuator may include a second photo-diode configured to receive light transmitted through at least another of the plurality of second optical fibers.

The first photodiode may be disposed to receive light from at least two of the plurality of second optical fibers.

In accordance with a third embodiment of the invention, a method of determining the position of the piston of the actuator described in the previous paragraph includes the steps of generating the beam of laser light, reflecting the beam of laser light off a surface fixed to move axially with the piston, receiving a first portion of the reflected beam by a first reflected light guide and a second portion of the reflected beam by a second reflected light guide, conducting the first and second portions of the reflected beam through first and second optical fibers to at least one remotely located light detector, and calculating a first time of flight of the beam based at least upon the first and second portions of reflected light.

The method may include the step measuring a second time of flight of the beam by moving the piston to a second location in the cylinder while simultaneously increasing the optical path length of both the first and second portions of the beam an equal amount.

The step of moving the piston to the second location may include the step of filling a chamber through which the an optical chamber.

The step of generating the beam may include the step of generating the beam with a wavelength of between 500 and 1700 nanometers, or between 500 and 1400 nanometers, or between 500 and 1150 nanometers, or between 700 and 1150 and within this range (preferably between 700 and 900 or 950 and 1025 or 1030 and 1150 nanometers), 1250 and 1400, or 1450 and 1650.

The step of generating the beam may include the step of generating the beam with a wavelength in the range of 840 and 980 nanometers.

The step of generating the beam may include the step of generating a sequence of individual pulses of light, and the step of calculating the first and second times-off-light may include the step of determining the time-of-flight of at least one pulse in the sequence of individual pulses of light.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
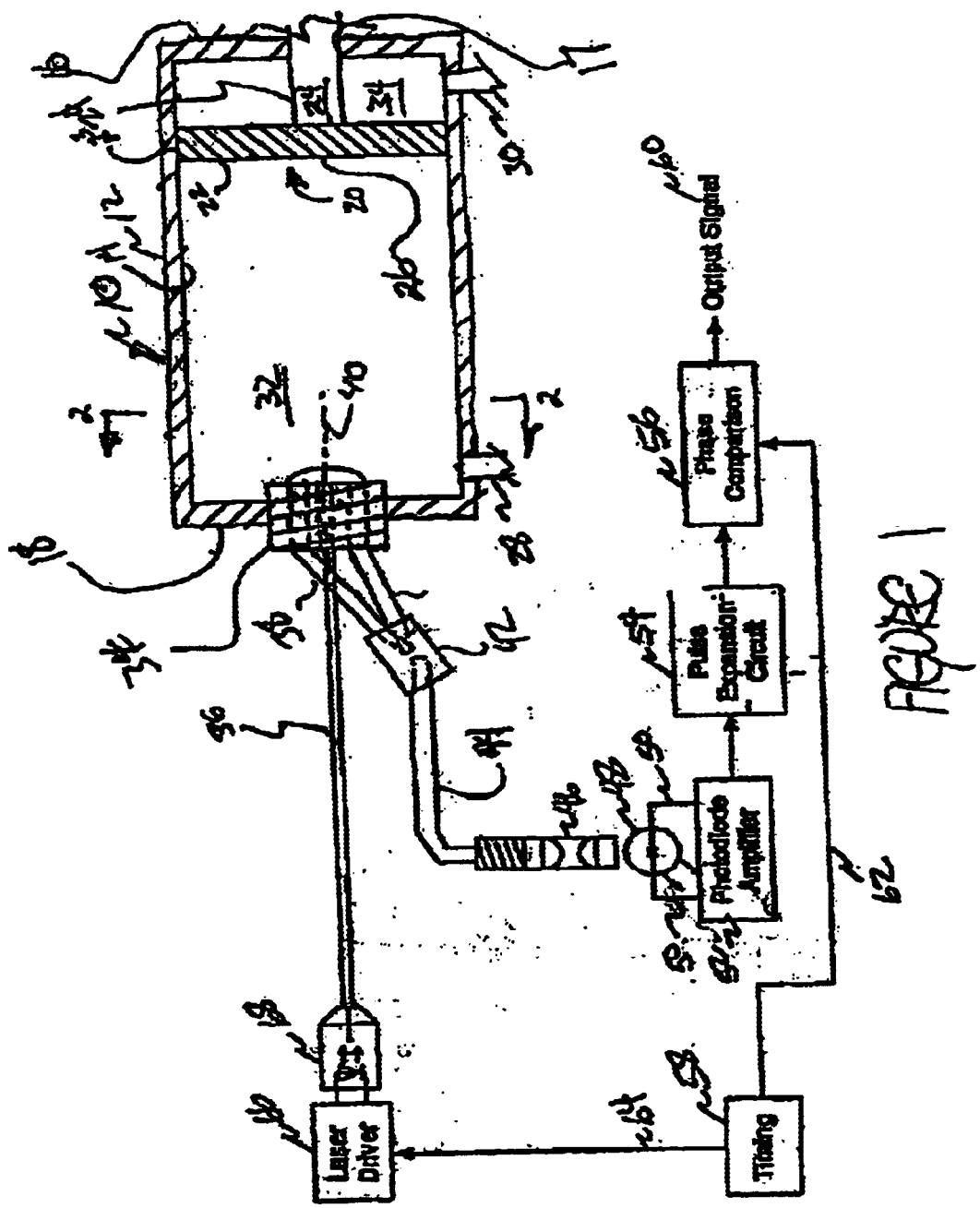
FIG. 1 is a partial cross-sectional view of a hydraulic actuator having the laser-based reflective beam sensor and a control unit for generating the laser beam and calculating the position of the actuator wherein the laser light sources are located remotely from the actuator and cables including three fiber optic light guides couple the control unit to the actuator.

FIG. 1 is a schematic view of a linear cylindrical actuator 10 in accordance with the present invention. Actuator 10 includes a cylinder 12 having an inner diameter 14 and two end caps 16, 18. Rod end cap 16 encloses one longitudinal end of the cylinder and has an opening 17 through which rod 24 passes. Opening 17 seals against the surface of the rod and prevents actuating fluid from leaking out. End cap 18 encloses the opposing end of the cylindrical potion of the cylinder and prevents actuating fluid from leaking out.

Actuator 10 also includes a piston assembly 20 which includes a piston 22 having an outside diameter 23 configured to seal against the inner diameter 14 of the cylinder and to slide longitudinally, back and forth, with respect to cylinder 12. Piston 22 is coupled to rod 24, which extends from the inside of the cylinder to the outside of the cylinder through opening 17 and is fixed to piston 22 to move simultaneously with the piston. Surface 26 is a reflective surface fixed to move with piston 22 and is configured to reflect laser light that is introduced into the cylinder. Two ports 28, 30 are provided in the cylinder to introduce an operating fluid into the cylinder or remove the operating fluid from the cylinder. Extension cylinder port 28 is disposed in the cylinder such that fluid introduced into the port will cause the piston and piston rod to move in a direction that increases the overall length of the actuator 10. Retraction cylinder port 30 is disposed in the cylinder such that when a working fluid is introduced into the actuator through this port, it causes the piston assembly to move into the cylinder, or retract, thereby reducing the overall length of actuator 10. When the working fluid is removed from retraction cylinder port 30, rod 24 extends farther outside the cylinder, increasing the overall length of actuator 10.

The cylinder and piston assembly collectively define two internal cavities separated by the piston into which fluid may be introduced or removed. Extension cavity 32, when filled (through port 28) causes the piston assembly to extend, increasing the overall length of the actuator. At the same time, retraction cavity 34 is emptied. Similarly, when retraction cavity 34 is filled, through retraction cylinder port 30, retraction cavity 34 fills with fluid, extension cavity 32 empties fluid through extension cylinder port 28.

Excluding the effects due to the size of piston rod 24, actuator 10 has a predetermined internal fluid volume that does not change based upon the position of the piston. This volume (again, discarding the effects due to the size of piston rod 24) is equal to the sum of the volumes of extension cavity 32 and retraction cavity 34.

Figure 2:
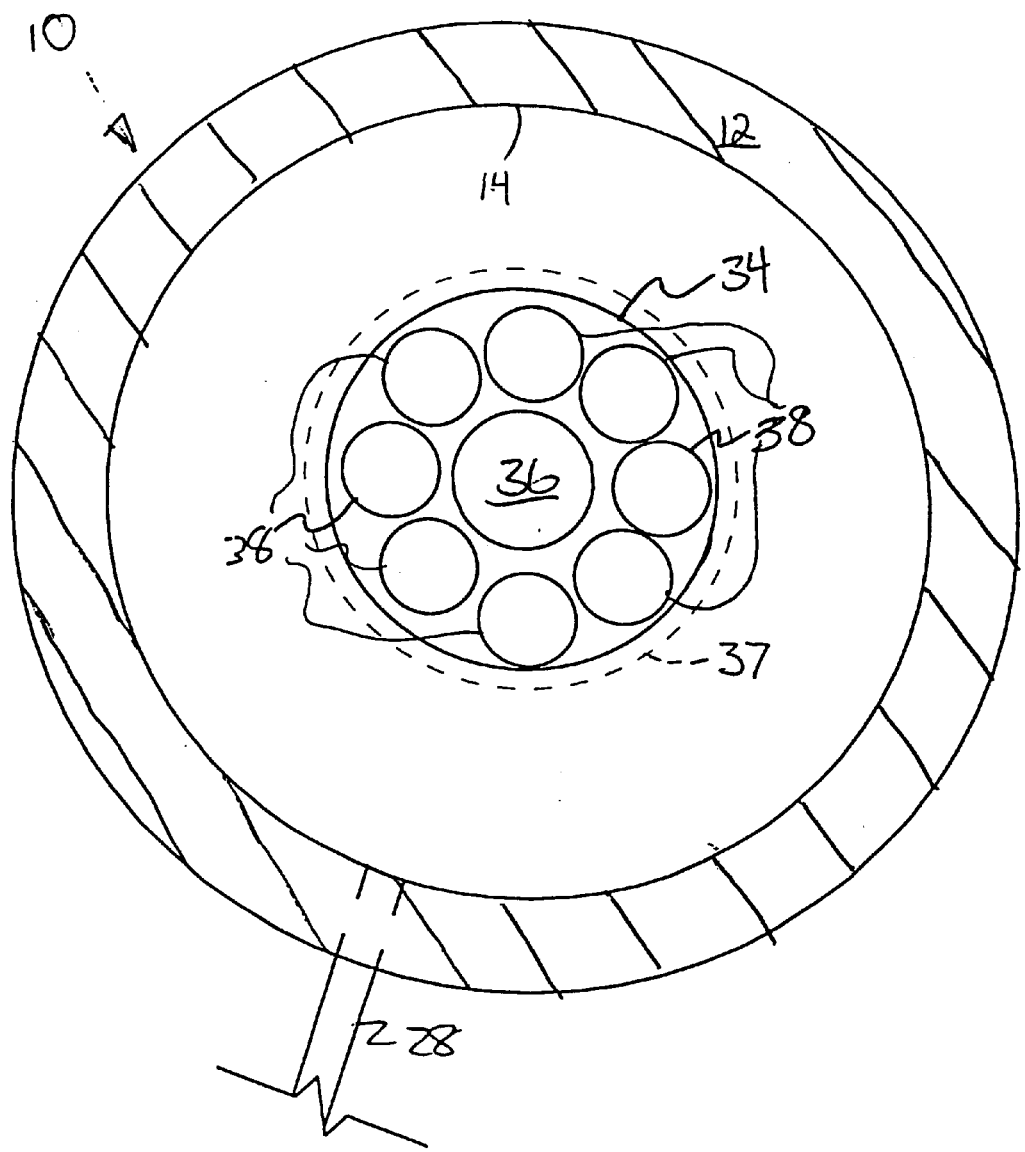
FIG. 2 is a partial cross-sectional view of the embodiment of FIG. 1 showing how the light guides are coupled to the cylinder.

An optical coupler 34 is fixed in end cap 18 to communicate laser light into chamber 32 and to communicate laser light from chamber 32 outside the cylinder. The cap itself has a threaded external surface 37 that engages mating threads in end cap 18. These threads serve to secure the coupler to the end cap and to prevent leakage of hydraulic fluid or air out of the cylinder. The coupler also serves to hold several optical fibers 36, 38 in a fixed relationship with respect to cylinder 12. Coupler 34 is preferably disposed along the centerline of cylinder 12 such that the cylinder and the coupler share a common cylindrical axis 40. Referring now to FIG. 2, coupler 34 supports eight optical fibers ranged in arcuate, preferably circular, pattern equidistantly spaced from the longitudinal cylindrical axis of the coupler. These fibers gather light that is reflected off surface 26 and conduct it out of the cylinder. Fiber 36 is disposed along axis 40 and conducts light from outside the cylinder into the cylinder. Light that is conducted into the cylinder through fiber 36 is directed towards reflective surface 26 on piston 22. It reflects off piston 22 and returns in a plurality of paths to each of optical fibers 28. These fibers receive the light at substantially the same time and conduct the light out of the cylinder. An optical multiplexer (combiner) 42 is optically coupled to fibers 38 and joins their/there individual light beams into a single beam that exits multiplexer (combiner) 42 in optical fiber 44. Thus, the light carried by optical coupler 44 is the combination of all the individual beams of light carried by optical fibers 38.

Referring now to FIG. 1, optical fiber 44 is at its other end connected to optical coupler 46 which directs and focuses the light beam of fiber 44 to photodiode 48. When the light passes through coupler 46 and falls upon photodiode 48, it changes the conductivity of the photodiode causing a change in the current flowing through circuit 50. This change in current, or photodiode signal, is amplified by photodiode amplifier 52. The output of photodiode amplifier 52 is fed to pulse expansion circuit 54 which increases the width of the photodiode signal. Phase comparison circuit 56 receives two impulses: the expanded pulse from pulse expansion circuit 54 and a trigger pulse from timing circuit 58. By determining the time difference between the pulse of timing circuit 58 and the expanded pulse from circuit 54, phase comparison circuit 56 generates a signal indicative of the time delay between these two pulses. This time delay signal is output signal 60.

Timing circuit 58 generates periodic pulses on the order of once every tenth of a second. These two pulses are provided on two signal lines: signal line 62 which goes to phase comparison circuit 56 and signal line 64 which goes to laser driver circuit 66. Laser driver circuit 66, when it receives this timing signal, generates a pulse that is applied to laser diode 68. Laser diode 68 turns the signal into a laser light pulse which is transmitted through optical fiber 36 and coupler 34 into cylinder 12. The laser light pulse traverses cavity 32, reflects off surface 26 and returns to optical fibers 38 which are held in coupler 34.

Referring back to phase comparison circuit 56, circuit 56 receives a pulse on line 62 generated by timing circuit 58. It also receives an expanded pulse from pulse expansion circuit 54. The difference in time of arrival of these two pulses is substantially equal to the amount of time it takes for the laser light pulse to travel from laser diode 68 to photodiode 48. Whenever piston 20 moves, both the path from laser diode 68 to the piston increases and the path from the piston to photodiode 48 increases. Since this is a linear device, for every inch of movement of piston 20 the path length changes by two inches.

Pulse expansion circuit 54 is disclosed in more detail in U.S. Pat. No. 6,005,395 as the directional sampler 74. The output of pulse expansion circuit 54 is an equivalent-time replica of the reflected pulses received by photodiode 48.

Phase comparison circuit 56 is described in U.S. Pat. No. 6,005,395 as directional set/reset circuit 100.

The output signal 60 is preferably in the form of a square wave having a pulse width indicative of the time required for the light emitted from laser diode 68 to travel through the system. Changes in the pulse width are preferably proportional to the distance the piston has traveled.

Referring now to FIG. 2, we see a cross-section of the end of actuator 10 taken at section 2—2 in FIG. 1. The coupler 34 is fixed to optical fibers 38 that transmit the reflected light beam out of the cylinder. In the embodiment shown, there are eight optical fibers arranged in a circular pattern about optical fiber 36, which is also supported in coupler 34. Coupler 34 is preferably disposed within the cylinder, as shown in FIG. 2, such that fiber 38 enters the cylinder substantially coaxial with longitudinal axis 40 of the cylinder. Each of the eight fibers 38 is preferably disposed equidistantly with respect to fiber 38 and together are preferably spaced equidistantly apart. In this manner, each fiber has a corresponding fiber disposed on the opposing side of optical fiber 38 from which they are both equally spaced.

In addition, the longitudinal axis of each of the optical fibers 38 and optical fiber 36 are preferably parallel such that light transmitted into the cylinder through optical fiber 38 will reflect off surface 26 of piston 20 and return directly to coupler 34. If surface 26 is disposed in a substantially perpendicular orientation with respect to the longitudinal axes of fibers 38 and 36, substantially all the light that is emitted into cylinder 12 by optical fiber 38 will arrive back at coupler 34.

The benefit of having several optical fibers for receiving reflected light is two fold. First, a smaller diameter optical fiber can be spaced closer to fiber 36. This closer spacing means that it is in a better position to receive the reflected light that reflects off perpendicular reflective surface 26. Secondly, by providing several optical fibers, considerably more reflected light can be gathered and provided to photodiode 48. This provides a substantially larger pulse and reduces any the possibility that stray reflections will trigger photodiode 48.

To provide this additive effect, each of optical fibers 38 is preferably the same length as the others of fibers 38. Thus, when the reflected light pulse is received substantially simultaneously at cylinder ends of optical fibers 38, each portion of the reflected pulse that travels down each reflected light fiber will arrive at multiplexer 42 at substantially the same time. Thus, any reflected light falling simultaneously on the receiving ends of fibers 38 will be combined and arrive simultaneously at the photodiode.

The spacing between fiber 36 and each of fiber 38 is preferably small, on the order of one to two centimeters. More preferably it is between five and ten millimeters.

Figure 3:
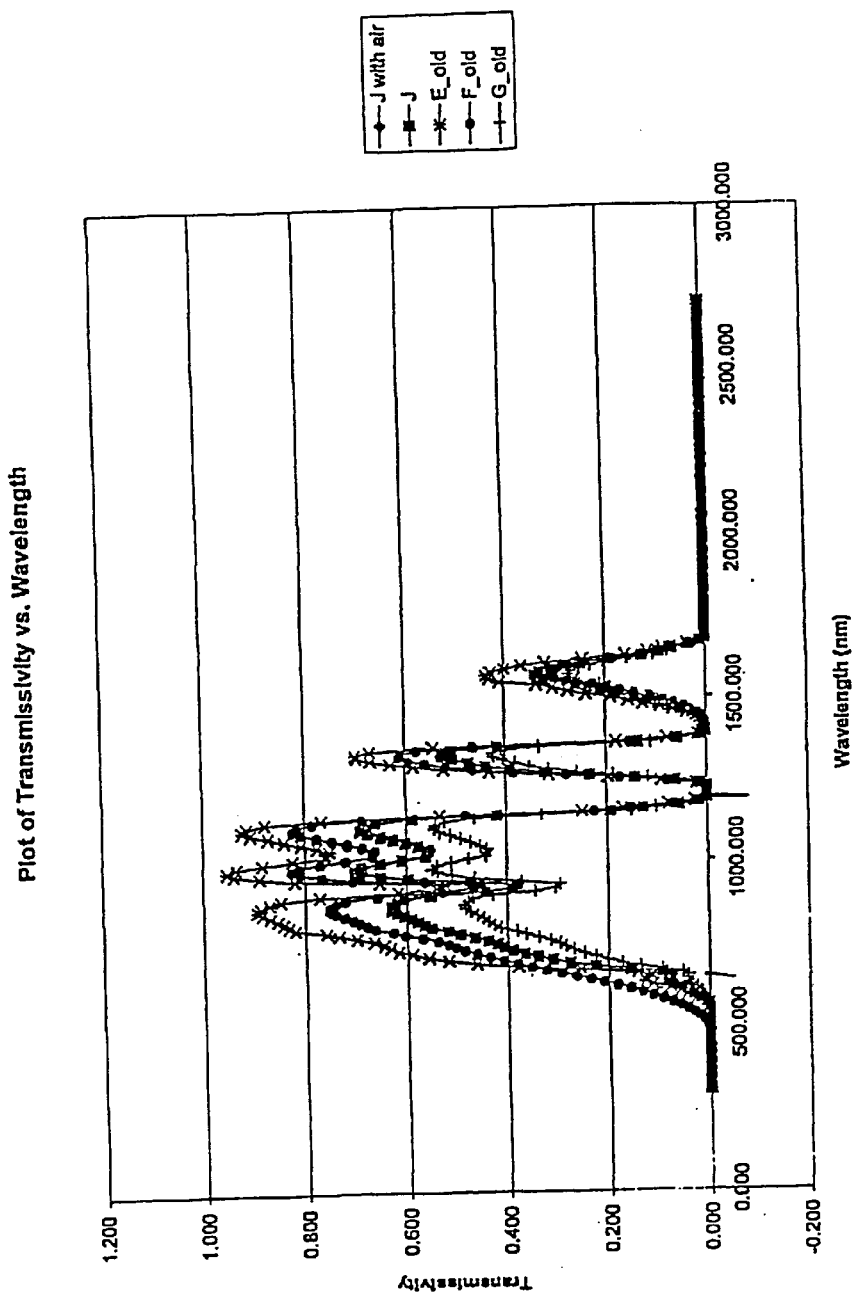
FIG. 3 is a plot of transmissivity versus wavelength of laser light through various hydraulic fluids of various types and ages.

FIG. 3 is a plot of transmissivity vs. wavelength. It measures the degree to which laser light is attenuated as it passes through hydraulic fluids of varying types. The types of hydraulic fluid tested include "J" type fluid with entrained air, "J" type fluid, old "E" type fluid, old "F" type fluid, and old "G" type fluid. Each of these types of hydraulic fluid are well known to engineers working with hydraulic fluids, and represent several of the most common fluids used in hydraulic systems today. The "E", "F" and "G" type fluids are "old" in that the fluids tested have been used in actual hydraulic equipment, and were not new. Three of the four hydraulic fluids that make up the J, E, F and G fluids are Case hydraulic fluids MS 1207 Hi Tran Plus, MS 1209 Hi Tran Ultra, and MS 1230. The reason these fluids were chosen was to see the degree to which aging and use of a hydraulic fluid would cause the optical characteristics of such fluid to degrade. The assumption is that degraded or "old" fluid by its accumulation of moisture, oxygen, and suspended particulates such as metal particles would not transmit laser light as readily as new hydraulic fluids. The chart in FIG. 3 indicates the qualities of each of the aforementioned fluids. Note that the transmission of light is restricted almost entirely in the range of 500–1700 nanometers. Outside this range, there is virtually no transmission of light. Within this range, however, there are three separate sub-ranges in which a significant amount of light is transmitted. These ranges are 700–1150 nanometers, 1250–1400 nanometers, and 1450–1650 nanometers. The broadest of these three ranges is the band between 700 and 1150 nanometers. In this range, there are three significant sub-ranges in which transmissivity is substantial these include the sub-range of 700–900 nanometers, 950–1025 nanometers, and 1030–1150 nanometers. Each of these sub-bands has a local transmissivity maximum at 850, 970, and 1090 nanometers, respectively. The other two major bands have their respective maxima at 1315 nanometers and 1560 nanometers, respectively.

Note that in comparing each of the hydraulic fluids, that the peak transmissivities in each of the bands and sub-bands does not vary substantially from the peak transmissivities of the other peak transmissivities. Comparing the "G_old" to the "E_old" fluids, although the variations in transmissivity at each of their respective maxima varies from 0.1 (at 1090 nanometers) to 0.4 (at 850 nanometers), the wavelengths of these respective maxima are the same.

Based upon this empirical analysis, it is clear that as hydraulic fluid ages its transmissivity peaks do not shift. An appropriate high power laser diode for transmitting light through the hydraulic fluid is preferably selected to have a wavelength at or near any of local maxima shown in FIG. 3. As that oil ages, and in the absence of any maxima wavelength shift, one would expect the transmissivity to drop, but not to shift radically based upon wavelength. For this reason, a laser diode having a frequency of 850, +80/−125 nanometers, 970+/−30 nanometers, or 1090+/−30 nanometers would be particularly preferred. While the other two major bands also exhibit strong transmissivity at their local maxima, due to the sudden and extreme drop-off on either side of the local maxima there less preferred. Nonetheless, even though they are less preferred, a laser diode having a wavelength of 1325 +/−50 nanometers, or 1560 +/−50 nanometers would also be acceptable.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A fluid actuated cylindrical actuator is provided comprising:
    a cylinder having first and second end;
    an end cap fixed to the first end of the cylinder and having a rod opening;
    a piston disposed in the cylinder;
    a rod coupled to the piston and extending from inside the cylinder to outside the cylinder and passing through the rod opening;
    a first light guide extending from inside the cylinder to outside the cylinder and adapted to transmit at least a first beam of laser light at a first frequency from outside the cylinder to inside the cylinder and to bar the passage of the fluid;
    and a plurality of second light guides having first ends extending from inside the cylinder to outside the cylinder and distal second ends that are coupled to at least one light detector, wherein each of the plurality of second light guides is configured to substantially simultaneously transmit at least a first reflected portion of the beam of laser light from inside the cylinder to outside the cylinder.

2. The actuator of claim 1, wherein the first light guide is disposed to transmit the first beam of laser light substantially along a longitudinal axis of the cylinder such that the first beam impinges on a reflective portion of the piston over substantially an entire range of piston travel.

3. The actuator of claim 2, wherein each of the second light guides is disposed on opposing sides of the first light guide such that they both receive a reflected portion of the light beam.

4. The actuator of claim 3, wherein each of the second light guides is disposed substantially equidistantly from the first light guide.

5. The actuator of claim 4, wherein the plurality of second light guides includes at least three light guides that are disposed along a semicircular arc about the first light guide.

6. The actuator of claim 5, wherein the second ends of the plurality of second light guides are optically coupled to a single light detector and wherein the light detector has an electrical output that is produced by light carried by at least two of the plurality of second light guides.

7. A hydraulic actuator for an agricultural or construction vehicle comprising:
    a cylinder having a substantially circular internal diameter and a longitudinal cylindrical axis;
    a piston having a substantially circular outer diameter and configured to be received in and hydraulically sealed against the inner diameter of the cylinder;
    a piston rod with a substantially circular outer rod diameter that is fixed to the piston and extends from the piston inside the cylinder, through a first end wall of the cylinder to a location outside the cylinder, wherein the first end wall is disposed to enclose and seal a first end of the cylinder and is substantially perpendicular to the longitudinal axis of the cylinder;
    a second end wall fixed to the cylinder and disposed to seal a second end of the cylinder substantially perpendicular to the longitudinal axis of the cylinder, the second end wall including a first optical path configured to transmit a beam of laser light through the second end wall to a reflective surface fixed to the piston and further including a plurality of second optical paths returning from the reflective surface to transmit the reflected beam of laser light back through the end wall in a plurality of return paths;
    a first optical fiber optically and mechanically coupled to the second end wall to transmit the beam of laser light from a remote laser light source to the first optical path; and
    a plurality of second optical fibers optically and mechanically coupled to the second end wall to transmit the reflected beam of laser light to at least one remote laser light receiver.

8. The hydraulic actuator of claim 7, wherein the first optical path and the plurality of second optical paths includes at least one hermetically sealed fiber optical feedthrough or connector extending through the second end wall.

9. The hydraulic actuator of claim 8, wherein the first optical fiber and the plurality of second optical fibers are multi-modal optical fibers.

10. The hydraulic actuator of claim 9, further comprising a first photo-diode configured to receive light transmitted through at least one of the plurality of second optical fibers.

11. The hydraulic actuator of claim 10, wherein the first photodiode is disposed to receive light from at least two of the plurality of second optical fibers.

12. The hydraulic actuator of claim 11, further comprising a second photodiode configured to receive light transmitted through at least another of the plurality of second optical fibers.

13. A method of determining the position of a piston in a hydraulic cylinder includes the steps of:
    generating a beam of laser light;
    reflecting the beam of laser light off a surface fixed to move axially with the piston;
    receiving a first portion of the reflected beam by a first reflected light guide and a second portion of the reflected beam by a second reflected light guide;

conducting the first and second portions of the reflected beam through first and second optical fibers to at least one remotely located light detector; and calculating a first time of flight of the beam based at least upon the first and second portions of reflected light.

14. The method of claim 13, further comprising the step measuring a second time of flight of the beam by moving the piston to a second location in the cylinder while simultaneously increasing the optical path length of both the first and second portions of the beam an equal amount.

15. The method of claim 14 the step of moving the piston to the second location may include the step of filling a chamber of the cylinder through which the beam passes while simultaneously moving the cylinder.

16. The method of claim 15, wherein step of generating the beam may include the step of generating the beam with a wavelength of between 500 and 1700 nanometers.

17. The method of claim 16, wherein step of generating the beam may include the step of generating the beam with a wavelength in the range of 840 and 980 nanometers.

18. The method of claim 16 wherein the step of generating the beam may include the step of generating the beam with a wavelength in the range of 700 and 1150 nanometers.

19. The method of claim 18 wherein the step of generating the beam may include the step of generating the beam with a wavelength in the range of 700 and 900 nanometers.

20. The method of claim 18 wherein the step of generating the beam may include the step of generating the beam with a wavelength in the range of 950 and 1025 nanometers.

21. The method of claim 18 wherein the step of generating the beam may include the step of generating the beam with a wavelength in the range of 1030 and 1150 nanometers.

22. The method of claim 16 wherein the step of generating the beam may include the step of generating the beam with a wavelength of between 1250 and 1400 nanometers.

23. The method of claim 16 wherein the step of generating the beam may include the step of generating the beam with a wavelength in the range of 1450 and 1650 nanometers.

24. The method of claim 17, wherein step of generating the beam may include the step of generating a sequence of individual pulses of light, and the step of calculating the first and second times-of-flight may include the step of determining the time-of-flight of at least one pulse in the sequence of individual pulses of light.

25. The method of claim 18, further comprising the step of simultaneously transmitting the sequence of pulses through the first and second optical fibers to arrive at the first photodiode at substantially the same time.

* * * * *